United States Patent
Kim

[11] Patent Number: 5,561,571
[45] Date of Patent: Oct. 1, 1996

[54] HEAD DRUM CONNECTION DEVICE

[75] Inventor: Sang-joon Kim, Suwon, Rep. of Korea

[73] Assignee: Samsung Electronics Co., Ltd., Kyungki-do, Rep. of Korea

[21] Appl. No.: 429,222

[22] Filed: Apr. 25, 1995

[30] Foreign Application Priority Data

Jun. 13, 1994 [KR] Rep. of Korea ............ 94-13700

[51] Int. Cl.⁶ .................................................. G11B 5/52
[52] U.S. Cl. .................................................. 360/107
[58] Field of Search .................. 360/84–85, 107–108

[56] References Cited

U.S. PATENT DOCUMENTS 5,010,432 4/1991 Fukashima ........................ 360/107
5,134,252 7/1992 Himeno ............................ 360/107

Primary Examiner—A. J. Heinz
Attorney, Agent, or Firm—Sughrue, Mion, Zinn, Macpeak & Seas

[57] ABSTRACT

In a head drum connection device, one end of a cable is fixed to an auxiliary circuit substrate of a head drum and the other end of the cable having a connection portion is combined with a connector shell having two pieces for supporting the connection portion in the combined state. A holder having a through-hole for fixing the connector shell at the center thereof and a binding groove for fixing a drum base to a deck are formed on a drum base. Also, a connector connected with the other end of the cable supported by the connector shell is installed on a main circuit substrate. As a result, the head drum is automatically electrically connected with the main circuit substrate when assembling the deck and the main circuit substrate.

5 Claims, 3 Drawing Sheets

HEAD DRUM CONNECTION DEVICE

BACKGROUND OF THE INVENTION

The present invention relates to a head drum connection device for a magnetic recording/reproducing apparatus such as a video tape recorder and, more particularly, to a head drum connection device wherein an electrical connection between a head drum and a main circuit substrate is automatically performed when a deck having the head drum is placed on the main circuit substrate.

In a conventional method., the head drum is connected to the main circuit substrate as shown in FIG. 1.

A head drum 10' is composed of an upper drum 11' and a lower drum 12', and a head (not shown) for recording and/or reproducing information is mounted therein. The head drum 10' is mounted on a deck 40' and a main circuit substrate 50' is located below the deck 40'. The head drum 10' and the main circuit substrate 50' are electrically connected by a flexible cable 20'. One end of the flexible cable 20' is connected to the interior of the lower drum 12' by a brazing process and the other end thereof is connected to a plug (not shown) formed on the main circuit substrate 50'. A coating of a connection portion 21' of the flexible cable 20', connected to the main circuit substrate 50', is removed to expose the wires therein. After the main circuit substrate 50' is mounted below the deck 40' the connection portion 21' is manually connected to the plug formed on main circuit substrate 50'.

Since the electrical connection between the head drum and the main circuit substrate is manually performed, connection quality and productivity are lowered.

SUMMARY OF THE INVENTION

To solve the above problem, it is an object of the present invention to provide a head drum connection device wherein an electrical connection between a head drum and a main circuit substrate is automatically performed when a deck having the head drum is mounted on the main circuit substrate.

To achieve the above object, there is provided a head drum connection device for a magnetic recording/reproducing apparatus which includes a drum base which is mounted on a deck located on a main circuit substrate to support a head drum, the head drum connection device connecting a cable introduced from the head drum to the main circuit substrate, wherein the head drum connection device comprises: a connector shell for encasing an end portion of the cable; a connector, which is installed on the main circuit substrate, for receiving the end portion of the cable so that the head drum and the main circuit substrate electrically connect with each other; and a holder, which is integrally formed with the drum base, for receiving and fixing the connector shell.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE INVENTION

Figure 1:
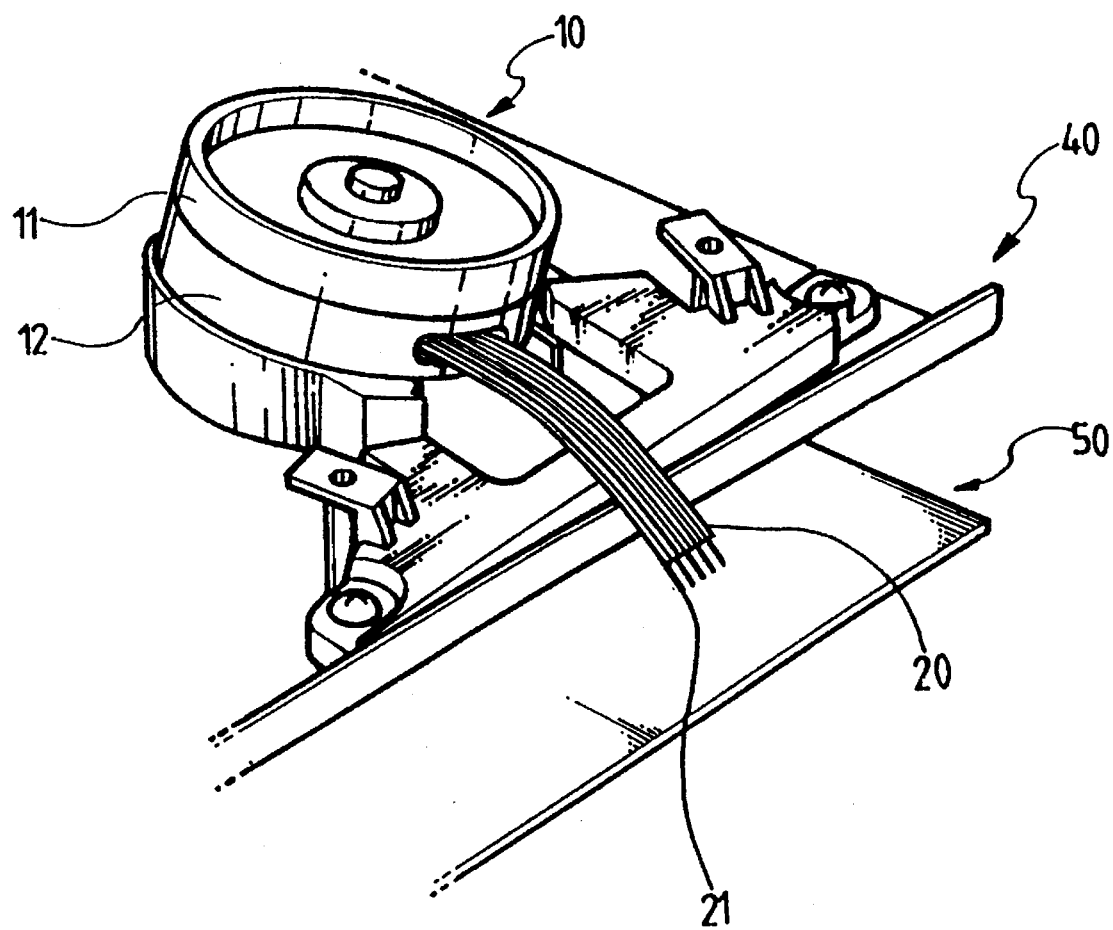
FIG. 1 is a perspective view showing a conventional head drum connection device.
Figure 2:
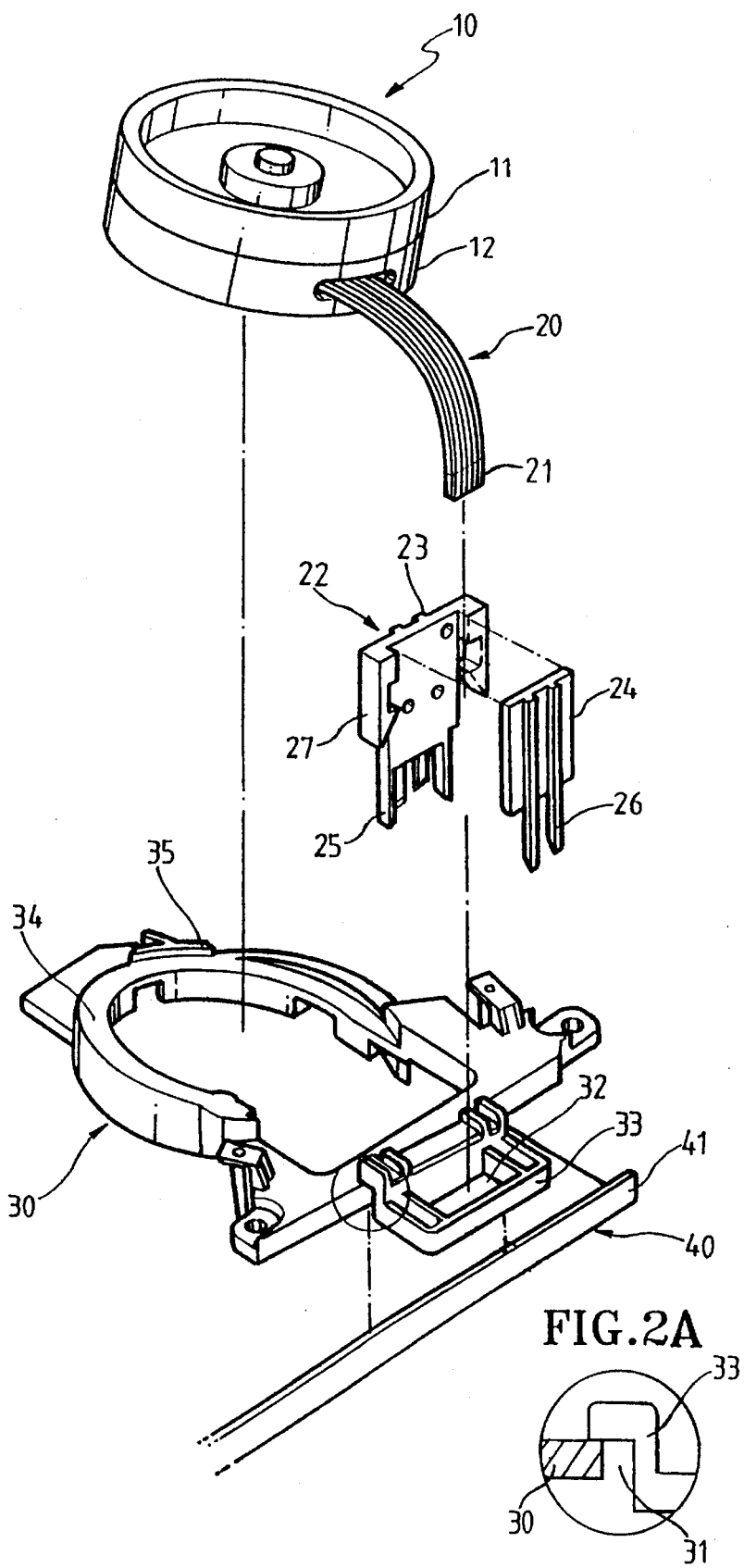
FIG. 2A is an exploded perspective view showing a head drum connection device according to the present invention.
FIG. 2B is a close-up view of a binding groove.
Figure 3:
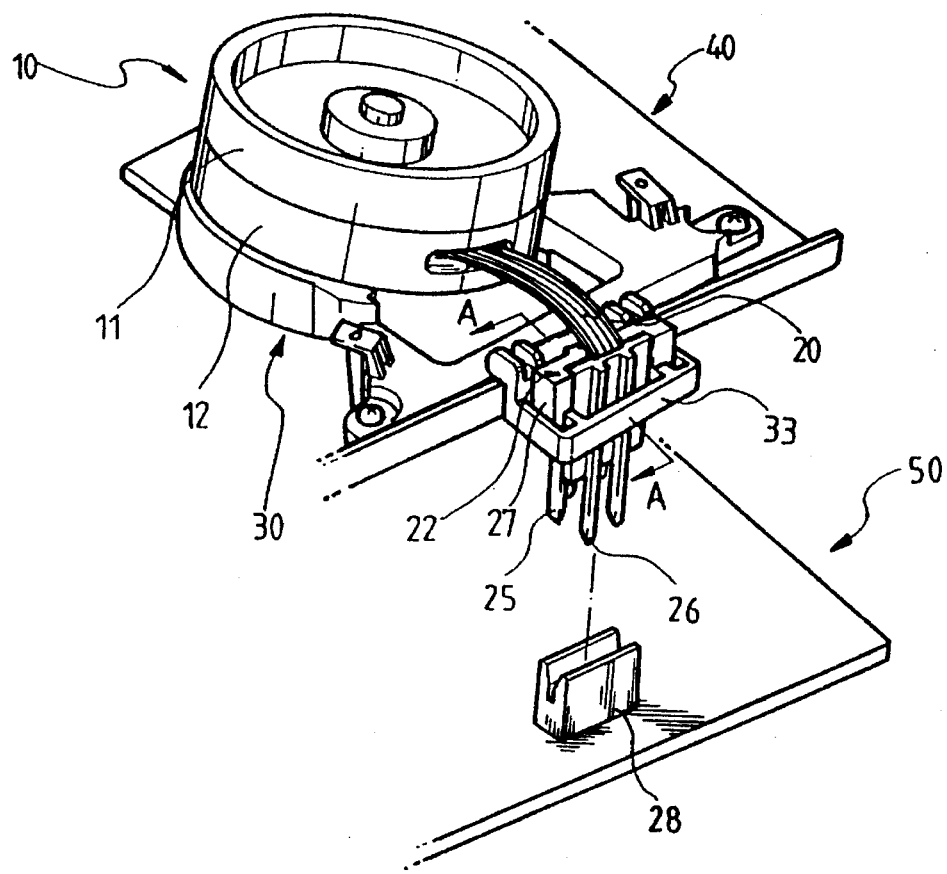
FIG. 3 is a perspective view showing the head drum connection device according to the present invention.

In FIGS. 2 and 3, a head drum 10 is composed of an upper drum 11 and a lower drum 12. A head (not shown) for recording information and/or reproducing the recorded information is installed in upper drum 11. In the interior of lower drum 12, an auxiliary circuit substrate for controlling the head is installed. This auxiliary circuit substrate is electrically connected to a main circuit substrate 50 via a flexible cable 20. The one end of the flexible cable 20 is connected to the interior of the lower drum 12 by a connection method such as brazing or the like and the other end thereof has a connection portion 21 whose coating is removed for being inserted into a connector shell 22 (described later).

Head drum 10 is positioned on a deck 40 to have a predetermined slope by a drum base 30. The drum base 30 has a hole 35 at the center thereof through which a fixed shaft of the head drum 10 passes. Here, the border of the hole 35 has a slope 34. The drum base 30 further comprises a holder or holding means 33 having a through-hole 32 at the center thereof, into which a connector shell 22 is inserted, and a binding groove 31 placed between the main body of the drum base 30 and the holding means 33 for fixing the drum base 30 to a border frame 41 of the deck 40.

The connector shell 22 is composed of two pieces 23 and 24 which can be connected to pass connection portion 21 of the flexible cable 20 therebetween. Pieces 23 and 24 are connected to each other so that the flexible cable 20 passing therebetween is fixed. Guide pieces 25 and 26 are attached at the bottom of pieces 23 and 24, for guiding the flexible cable 20 so as to be automatically connected to a connector 28 (see FIGS. 3 and 4) mounted on the main circuit substrate 50 when assembling the deck 40 and the main circuit substrate 50. Also, at least one of the pieces 23 and 24 is formed ' with a pair of fixing members 27 on each side thereof, for being fixed to the holding means 33 when inserted into the holding means 33. The fixing members 27 have opposing slanted end portions for being inserted into holding means 33 by an elastic force of the fixing members 27.

Figure 4:
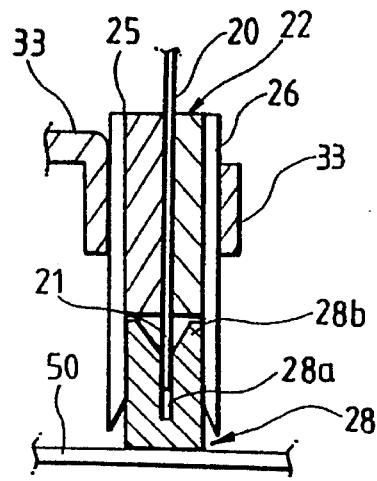
FIG. 4 is a sectional view taken along line 4—4 of FIG. 3.

FIG. 4 is a sectional view taken along line 4—4 of FIG. 3 for illustrating the connection between the connection portion 21 and the connector 28.

The flexible cable 20 passes through the connector shell 22 and is fixed thereto, and the connection portion 21 of the cable 20 whose coating is removed protrudes from connector shell 22 by a predetermined length. The connector shell 22 is fixed to the holding means 33 formed as one body with the drum base 30 by the fixing members 27 described with respect to FIG. 2. A groove 28a into which the connection portion 21 is inserted and a land 28b surrounding groove 28a are formed on the connector 28 which in turn is formed on the main circuit substrate 50. The guide pieces 25 and 26 of the connector shell 22 serve to guide connector shell 22 to the land 28b so that the connection portion 21 is stably seated in the groove 28a.

Therefore, when the deck 40 and the main circuit substrate 50 are assembled, the connection portion 21 of the flexible cable 20 fixed by the connector shell 22 is automatically connected to the connector 28 along the guide pieces 25 and 26.

As described above, in the head drum connection device according to the present invention, the flexible cable for actively transferring an electrical signal between the main circuit substrate and the head drum is automatically connected when the deck and main circuit substrate are assembled.

Thus, the assembling procedure is shortened compared with the conventional method wherein an operator manually electrically connects the head drum and the main circuit substrate using the flexible cable only after the head drum and the main circuit substrate are assembled. As a result, the head drum connection device according to the present invention is useful for improving quality and productivity.

It is contemplated that numerous modifications may be made to the head drum connection device of the present invention without departing from the spirit and scope of the invention as defined in the following claims.

What is claimed is:

1. A head drum connection device for a magnetic recording/reproducing apparatus which includes a drum base which is mounted on a deck located on a main circuit substrate to support a head drum, said head drum connection device connecting a cable introduced from the head drum to the main circuit substrate, said head drum connection device comprising:

a connector shell for encasing an end portion of the cable;

a connector, which is installed on the main circuit substrate, for receiving the end portion of the cable so that the head drum and the main circuit substrate electrically connect with each other; and a holder, which is integrally formed with the drum base, for receiving and fixing said connector shell.

2. The head drum connection device as claimed in claim 1, wherein said holder is formed with a throughhole at a center thereof, into which said connector shell is inserted and fixed.

3. The head drum connection device as claimed in claim 1, wherein guide pieces are attached at a bottom portion of said connector shell, which guide the cable to be automatically connected to said connector mounted on the main circuit substrate.

4. The head drum connection device as claimed in claim 1, wherein said connector shell is provided with a pair of fixing members on each side thereof, said fixing members each having an opposing slanted end portion for being inserted into said holder by an elastic force of the fixing members.

5. The head drum connection device as claimed in claim 1, further comprising a binding groove between the drum base and said holder, into which a border frame of the deck is introduced and fixed.

* * * * *